Sept. 11, 1934.  L. C. ALLEN  1,972,969
CONVEYER SYSTEM
Original Filed March 3, 1930  3 Sheets-Sheet 1
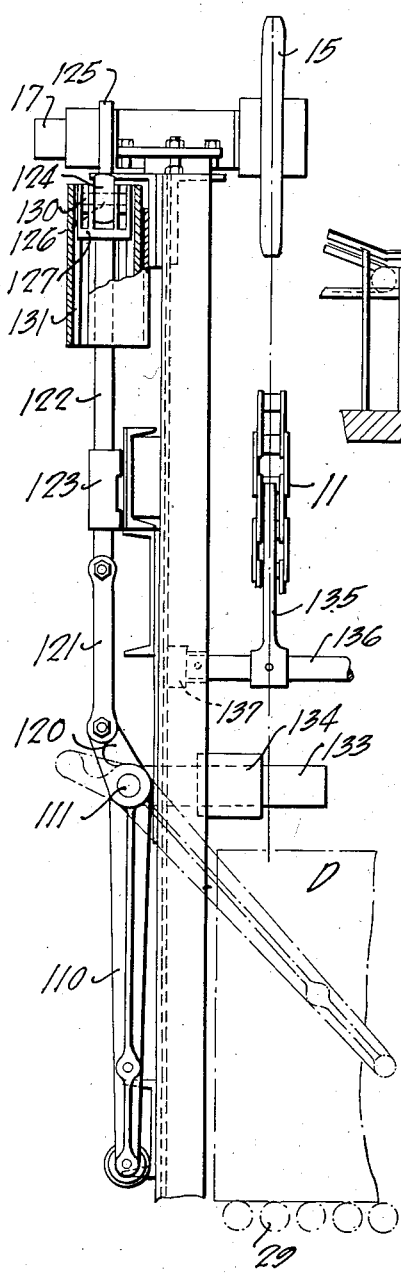
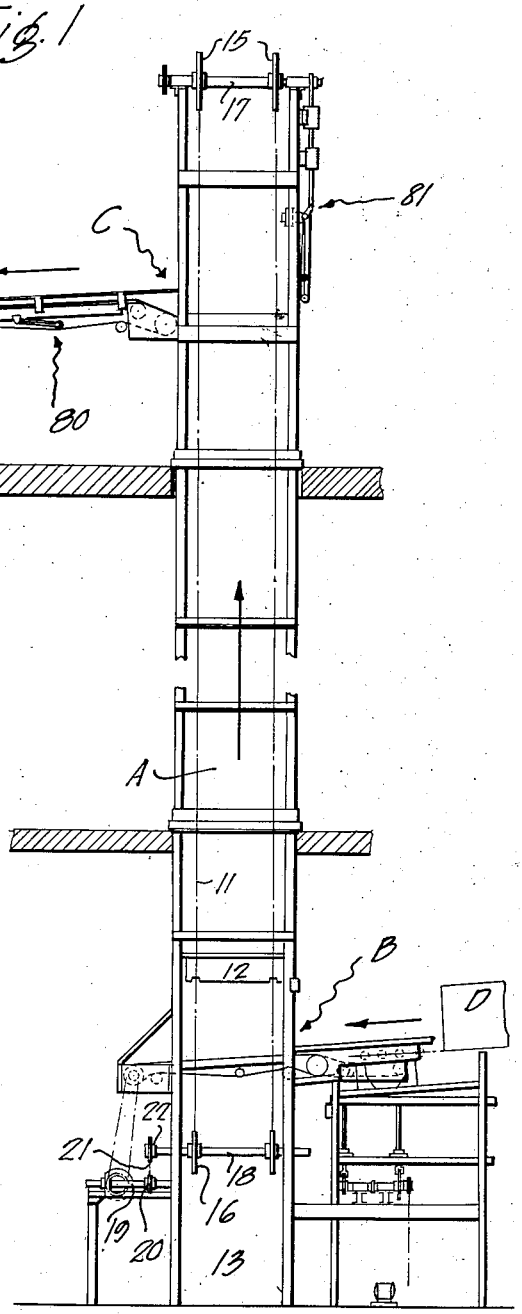
INVENTOR
LAVONT C. ALLEN
by Roberts, Cushman & Woodberry
ATT'YS Sept. 11, 1934. L. C. ALLEN 1,972,969
CONVEYER SYSTEM
Original Filed March 3, 1930 3 Sheets-Sheet 2
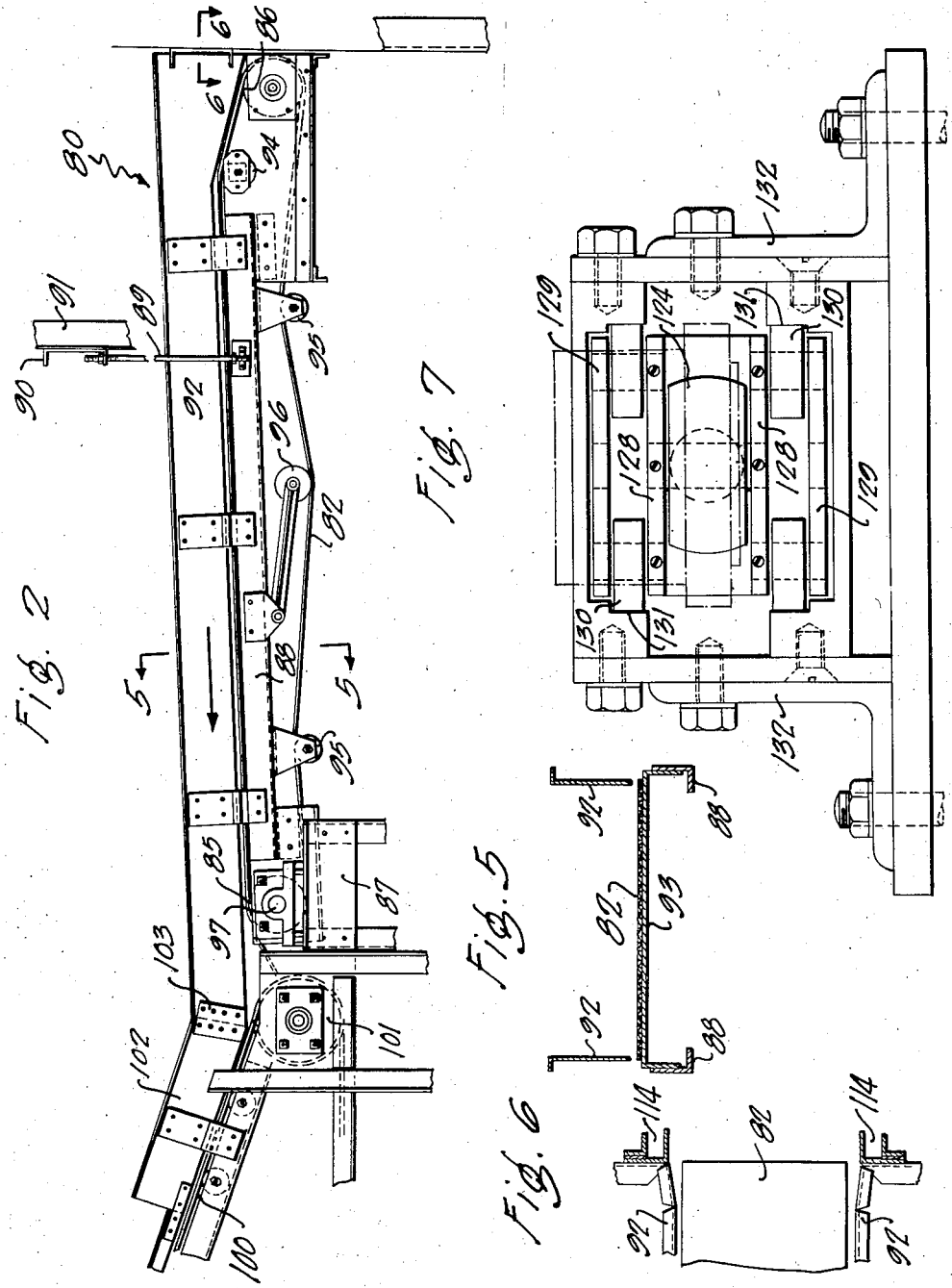
INVENTOR
LAVONT C. ALLEN
by Roberts, Cushman & Woodbury
ATT'YS Sept. 11, 1934.        L. C. ALLEN        1,972,969
CONVEYER SYSTEM
Original Filed March 3, 1930    3 Sheets-Sheet 3
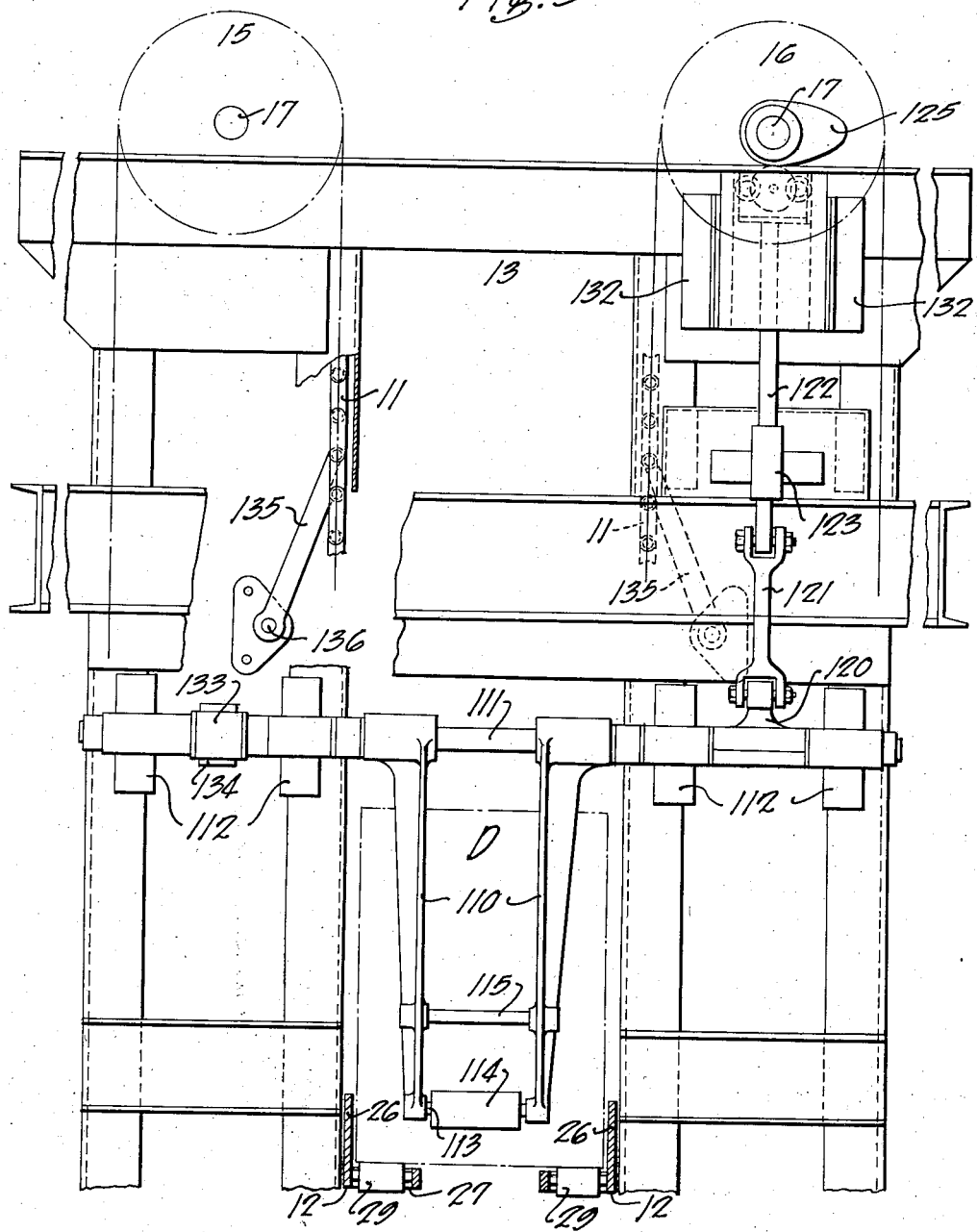
INVENTOR
LAVONT C. ALLEN
by Roberts, Cushman & Woodberry
ATT'YS Patented Sept. 11, 1934

1,972,969

UNITED STATES PATENT OFFICE 1,972,969

CONVEYER SYSTEM

Lavont C. Allen, Syracuse, N. Y., assignor to The Lamson Company, Syracuse, N. Y., a corporation of Massachusetts Original application March 3, 1930, Serial No. 432,636. Divided and this application March 9, 1931, Serial No. 521,079

11 Claims. (Cl. 198—24)

This invention relates to an improvement in a vertical conveyer and more particularly in a continually moving conveyer in which, while the conveyer is traveling in one direction, the load is supplied thereto at one station and in which, during the further travel of the conveyer in that direction, the load is delivered therefrom, one example of which is shown in the Jennings and Libby application Serial No. 432,666, filed March 3, 1930, and the instant application is a division of my copending application Serial No. 432,636, filed March 3, 1930.

One object of this invention is to provide a vertical conveyer comprising belts, chains or similar traveling means on which are supported suitably spaced carriers by which the loads are transported from one station to another during the upward travel of the conveyer and means for removing the loads from the vertical conveyer to a delivery conveyer, the end of which is rigidly fixed against any movement relative to the vertical conveyer.

A further object of the invention is to provide, at the unloading station, mechanism comprising a delivery conveyer and an ejector which is operated in timed relation to the operation of the vertical conveyer and by which the load on the carriers is ejected onto the delivery conveyer, such delivery conveyer being characterized by having its end adjacent the vertical conveyer inclined downwardly so that the load may be ejected onto the delivery conveyer while the vertical conveyer is in operation without the necessity of shifting the end of the delivery conveyer in unison with the carrier.

Other objects will appear from a consideration of the following specification and the drawings which form a part thereof and in which Fig. 1 is a front elevation of a vertical conveyer equipped with unloading mechanisms constructed in accordance with this invention;

Fig. 2 is an enlarged front elevation of the delivery conveyer which forms one part of the unloading mechanism;

Fig. 3 is a side elevation of the ejector which forms another part of the unloading mechanism;

Fig. 4 is a rear elevation of the ejector;

Fig. 5 is a sectional view taken along the line 5—5 of Fig. 2;

Fig. 6 is a plan view, partially in section, taken along the line 6—6 of Fig. 2; and Fig. 7 is a plan view of the ejector operating mechanism.

The apparatus as set forth in Fig. 1 comprises briefly a vertical conveyer A in combination with loading mechanism at station B and unloading mechanism at station C. The conveyer A travels continually and both the loading and unloading operations take place during its upward movement, no such operations taking place during its downward movement.

The vertical conveyer A consists of two pairs of chains 11 and carriers 12 which are mounted upon each pair of chains 11. Only one carrier 12 is shown in Fig. 1, but it will be understood that there are a plurality of such carriers mounted upon each pair of chains. The conveyer travels in a well 13 formed of suitable frame members and the chains 11 are supported upon sprocket wheels 15 and 16 carried upon transversely extending shafts 17 and 18 respectively. The shafts 17 at the top of the well 13 are here shown as driven shafts and the shafts 18 at the bottom of the well are drive shafts operated from any suitable source of power supplied to the stub shaft 19. On the shaft 19 is mounted a sprocket wheel 20 by which is driven a chain 21 which passes around sprocket wheels 22 on the ends of the shafts 18. The particular manner of driving the shafts 18 forms no part of the present invention and any suitable means for so doing may be employed.

The carriers 12 are flights each of which comprises an angle plate consisting of an upright portion 26 and a horizontally extending portion 27 attached to the chains 11 in any suitable manner. The loads rest on the portions 27 in each of which is embedded a series of rollers 29 to eliminate any friction that might occur during the loading or unloading operations. The flights are so spaced upon the chains 11 that, during the upward travel thereof, the flights on one pair of chains are in horizontal planes with the flights on the other pair of chains and thus form carriers in which the loads are supported.

The mechanism at the unloading station C comprises a delivery conveyer 80 and an ejector 81. The delivery conveyer 80 (see Fig. 2) comprises a belt 82 and a pair of end rollers 85, 86, the roller 85 being mounted upon a suitably located platform 87 and the roller 86 upon a frame 88 pivotally supported at one end upon the shaft 97 of the roller 85 and suspended at the other end by hanger rods 89 from a crossbeam 90 carried by uprights 91 of the well frame. The rods 89 are adjustable to determine the relation of the frame 88 to the well 13. Suitable guide walls 92 are provided at each side of the conveyer belt 82 being supported by straps on the frame 88 on which is also supported a floor 93 over which the conveyer belt passes.

The roller 86 is mounted below the plane of the main portion of the upper run of the belt 82 and an idle roller 94 is fixed in the frame at the end of the floor 93 over which the upper run of the conveyer passes. As shown in Fig. 2, the frame 88 is adjusted by the rods 89 so that the portion of the upper run between the roller 94 and the roller 86 is inclined upwardly away from the elevator well and at an angle to the downwardly inclined portion of the run between the roller 85 and the roller 94. The lower run of the conveyer passes over a pair of idler rollers 95 and under a weighted roll 96 which functions in the usual way to keep the upper run of the conveyer taut. Suitable means are provided by which conveyer belt 82 is caused to travel continually with the upper run proceeding away from the well as shown by the arrow in Fig. 2. Such means are preferably applied to the shaft 97 of the roller 85, in any well known manner. At the delivery end of the conveyer 80 is mounted a conveyer belt 100 passing at its forward end around a roller 101 between guide walls 102 which are secured to the guide walls 92 by straps 103 after the frame 88 has been positioned relative to the well 13 by means of the adjustable hanger rods 89. The frame 88 after being positioned is secured to the frame of the well by brackets (not shown) so that the frame and conveyer are rigidly fixed against transverse movement. The walls 92 preferably diverge adjacent the well 13 as is shown in Fig. 6.

The ejector 81 comprises a pair of arms 110 rigidly mounted on a shaft 111 supported in suitable bearings 112 on the frame of the well. The arms 110 are connected at their lower ends by a shaft 113 on which a roll 114 is mounted. A secondary connection 115 is also provided in order to ensure that the arms 110 are properly spaced. Mounted on the shaft 111 between the bearings 112 at the right in Fig. 3 is an arm 120 which is connected by a link 121 to a reciprocable rod 122. The rod 122 is adapted to slide in bearings 123 mounted upon the frame of the well and carries at its upper end a roller 124, which at all times engages a cam 125 carried by one of the shafts 17, as shown in Figs. 3 and 4.

The roller 124 is mounted on a shaft 126 supported in a box 127 which is suitably secured to or may be integral with the rod 122. The box is open at the top and opposite ends and is provided with walls 128 intermediate and parallel to the side walls 129. The shaft 126 is so carried by the walls 128 that the roller 124 projects from the top of the box (see Fig. 4). Mounted on stub shafts carried by the walls 128 and 129 are rollers 130 which project beyond the ends of the box, as shown in Fig. 7. The rollers 130 bear against guide strips 131 attached by brackets 132 to the frame of the well so that the box 127 thus rides freely and follows the contour of the cam 125. For the purpose of ensuring the contact of the roller 124 with the cam 125, there is mounted upon the shaft 111 between the bearings 112 at the left in Fig. 3 an arm 133 which carries a weight 134. The weight 134 plus the weight of the ejector arms 110 holds the roller 124 at all times in engagement with the cam 125.

The cam 125 is so constructed and positioned that the rod 122 will be depressed just at the time that a carrier 12 reaches the position shown in Fig. 3. The depression of the rod 122 by the cam 125 causes the arms 110 to swing from the full line position of Fig. 4 into the dotted line position thereof and accordingly moves the load from the carrier onto the delivery conveyer 80. Due to the inclination of the inner end of the conveyer 80, the forward edge of the case D forming the load is brought into engagement with the end of the belt 82 as soon as it is shifted by the ejector arms 110 and as the arms continue to advance, the case is moved up the incline by the arms and by the movement of the conveyer belt so that when the ejector arms have reached their final position the case is entirely supported by the conveyer and is quickly carried out of the well so that it will not engage the carriers 12 traveling therein.

The conveyer A moves continuously and in order to avoid any tendency of the chains 11 to retreat when the load is applied to the carrier I have provided a pair of brake arms 135, which at all times engage with the crossbars of the chains and prevent them from retreating. The brake arms 135 are carried by shaft 136 mounted in bearings 137 on the frame of the well whereby the shafts turn freely and the ends of the arms which are suitably formed as shown in Fig. 3 maintain their engagement with the chains.

The vertical conveyer A is set in motion together with the loading mechanism at station B and the unloading mechanism at station C. The cases D fed to the carriers 12 at station B are raised thereby to station C. When each carrier 12 arrives at station C, the ejector 81 is actuated and any load thereon is transferred onto the delivery conveyer 80. The conveyer belt 82 carries the load to the belt 100 by which it is transported to the desired destination.

While one embodiment of this invention has been described I am not limited thereto, since other embodiments may be made without departing from the spirit and scope of the invention as set forth in the following claims.

I claim:

1. The combination with a vertical conveyer adapted to receive a load at one station in its upward travel and to deliver the load at another station during such upward travel and comprising means vertically traveling in a well and carriers supported by such means and on which the load is transported, of mechanism at the unloading station comprising load ejecting means, a delivery conveyer the end of which adjacent the well is inclined upwardly and fixed against movement onto which delivery conveyer the load is shifted by the ejecting means and a means for moving the load upwardly along the delivery conveyer away from the well.

2. The combination with a vertical conveyer adapted to receive a load at one station in its upward travel and to deliver the load at another station during such upward travel and comprising means vertically traveling in a well and carriers supported by such means and on which the load is transported, of mechanism at the unloading station comprising load ejecting means and a delivery conveyer including a frame the forward end of which is fixed in relation to the well and inclined upwardly onto which end the load is shifted by the ejecting means and means for moving the load upwardly along the conveyer away from the well, the operation of the ejecting means at the unloading station being continually in timed relation to the upward movement of the vertically traveling means.

3. The combination with a vertical conveyer comprising means continuously traveling in a vertical well, mechanism for actuating said traveling means and carriers supported by such means for upward and downward travel in the well and on which loads are transported to an unloading station during the upward travel of the carriers of unloading means including an ejector at such station normally out of the path of carriers through the well and continually moved into the well by such mechanism in timed relation to the carriers, and a delivery conveyer including a fixed frame a traveling belt thereon and a means for so supporting the belt that it is movable in an inclined plane upwardly away from the well whereby the ejector will contact with the loads on any of the carriers and remove them therefrom out of the well onto the belt, said belt and ejector coacting to move the loads upwardly away from the well.

4. The combination with a vertical conveyer having load supporting carriers and means for moving said carriers upwardly and downwardly in a well, of mechanism for unloading such carriers during the upward movement thereof which mechanism comprises a fixed frame at one side of the well, a conveyer on said frame by the upper run of which loads are transported from the well, said conveyer being so supported on the frame that the portion of the upper run adjacent the well is at all times inclined upwardly away from the well, means for operating said conveyor and means for engaging the loads on the carriers and ejecting them from the well onto the conveyer, the leading edge of each load being received by the inclined portion of the upper run and moved upwardly in register with the carrier from which it is ejected.

5. The combination with a vertical conveyer having load supporting carriers and means for moving said carriers upwardly and downwardly in a well, of mechanism for unloading such carriers during the upward movement thereof which mechanism comprises a fixed frame at one side of the well, rollers on said frame, a conveyer belt supported by said rollers, means for driving said belt so that the upper run thereof transports loads away from the well, the roller on the frame nearest the well being in a plane below the next adjacent roller whereby the portion of the upper run between said rollers is at all times inclined upwardly and away from the well, and means for engaging the loads on the carriers and ejecting them onto the belt, the leading edge of each load being received by the inclined portion of the upper run and moved upwardly in register with the carrier from which it is ejected.

6. The combination with a vertical conveyer comprising means continuously traveling in a vertical well, mechanism for actuating said traveling means and carriers supported by such means and on which loads are transported to an unloading station, of unloading means including an ejector at such station normally out of the path of carriers through the well and continually moved into the well by such mechanism in timed relation to the carriers and independent thereof said ejector comprising arms connected at one end, a shaft on which the other ends of the arms are rigidly mounted, a second arm on said shaft, a reciprocable rod, a link connecting said second arm and said rod, a roller carried by said rod, and a cam actuated by said mechanism and with which said roller is held in contact whereby said mechanism causes said ejector to contact with the loads on any of the carriers and remove them therefrom.

7. The combination with a vertical conveyer comprising means continuously traveling in a vertical well and carriers supported by such means for upward and downward travel in the well and on which loads are transported to an unloading station during the upward travel of the carriers, of unloading mechanism including a delivery conveyer comprising a fixed frame, a belt thereon and means carried by the frame for so supporting the belt that the upper run thereof adjacent the conveyer well travels at all times upwardly and away from the well.

8. The combination with a vertical conveyer comprising means continuously traveling in a vertical well and carriers supported by such means for upward and downward travel in the well and on which loads are transported to an unloading station during the upward travel of the carriers, of loading mechanism including a delivery conveyer comprising a fixed frame, a plurality of rollers thereon, a belt trained over the rollers, the rollers supporting the upper run being triangularly arranged so that the upper run travels at all times over said rollers away from the well upwardly and then outwardly and means for driving the belt.

9. The combination with a vertical conveyer comprising means continuously traveling in a vertical well and carriers supported by such means for upward and downward travel in the well and on which loads are transported to an unloading station during the upward travel of the carriers, of unloading mechanism including an ejector at such station, and a delivery conveyer including a fixed frame, a belt movable thereon and means for so supporting the belt that the upper run thereof travels upwardly away from the well, the ejector moving the loads on the carriers transversely thereof into contact with the belt while the carriers are in motion, and said belt and ejector coacting to remove the loads from the well.

10. The combination with a vertical conveyer comprising means continuously traveling in a vertical well and carriers supported by such means for upward and downward travel in the well and on which loads are transported to an unloading station during the upward travel of the carriers, of unloading mechanism including an ejector at such station, and a delivery conveyer incuding a fixed frame, a traveling belt thereon and means for so supporting the belt that it is movable in an inclined plane away from the well whereby the ejector will contact with the loads on the carriers and remove them therefrom out of the well onto the belt, said belt and ejector coacting to move the loads away from the well in the inclined plane.

11. The combination with a vertical conveyer comprising means continuously traveling in a vertical well and carriers supported by such means for upward and downward travel in the well and on which loads are transported to an unloading station during the upward travel of the carriers, of unloading mechanism including an ejector at such station, and a delivery conveyer including a fixed frame, rollers mounted therein, a belt trained over the rollers, the rollers supporting the upper run thereof so that the belt travels away from the well first upwardly at an angle thereto and then outwardly and means for driving the belt.

LAVONT C. ALLEN.